(12) United States Patent
Jahn et al.

(10) Patent No.: US 12,140,273 B2
(45) Date of Patent: Nov. 12, 2024

(54) PRESSURE VESSEL AND METHOD FOR FILLING IT

(71) Applicant: ASS-NBG GmbH, Tambach-Dietharz (DE)

(72) Inventors: Andreas Jahn, Tambach-Dietharz (DE); Tobias Ortlepp, Floh-Seligenthal (DE)

(73) Assignee: ASS-NBG GmbH, Tambach-Dietharz (DE)

( * ) Notice: Subject to any disclaimer, the term of this patent is extended or adjusted under 35 U.S.C. 154(b) by 0 days.

(21) Appl. No.: 18/064,227

(22) Filed: Dec. 9, 2022

(65) Prior Publication Data
US 2023/0184389 A1 Jun. 15, 2023

(30) Foreign Application Priority Data

Dec. 10, 2021 (DE) ...................... 10 2021 132 643.5

(51) Int. Cl.
*F17C 13/04* (2006.01)

(52) U.S. Cl.
CPC ...... *F17C 13/04* (2013.01); *F17C 2205/0314* (2013.01); *F17C 2205/0332* (2013.01); *F17C 2205/0391* (2013.01)

(58) Field of Classification Search
CPC .............. F17C 13/04; F17C 2205/0314; F17C 2205/0332; F17C 2205/0382; F17C 2205/0388; Y10T 137/1714
See application file for complete search history.

(56) References Cited

U.S. PATENT DOCUMENTS

| 4,676,271 A | 6/1987 | Fujikawa |
| 4,978,832 A | 12/1990 | Rubin |

(Continued)

FOREIGN PATENT DOCUMENTS

| DE | 4334182 A1 * | 4/1995 | ............ F16K 1/305 |
| DE | 20 2004 004659 U1 | 5/2004 | |

(Continued)

OTHER PUBLICATIONS

Machine translation of DE4334182A1 retrieved from espacenet.com on Sep. 21, 2023. (Year: 2023).*

(Continued)

*Primary Examiner* — Jessica Cahill
(74) *Attorney, Agent, or Firm* — Marshall-Melhorn, LLC (57) ABSTRACT

The invention relates to a pressure vessel comprising: a vessel body, wherein, at an upper end of the vessel body, an end section is integrally formed with the vessel body, which has an opening, and a valve arranged in the end section. At least two outflow openings are formed in the wall surrounding the opening of the end region below the opening, which are in particular arranged opposite one another. In an outflow position of the valve, the outflow openings are fluidically connected via the valve to a body interior of the vessel body and the opening of the end region is closed in a media-tight manner, and, in a filling position of the valve, the opening of the end region is fluidically connected to the body interior of the vessel body via the valve. Furthermore, the invention relates to a method for filling the pressure vessel.

19 Claims, 6 Drawing Sheets

(56) References Cited

U.S. PATENT DOCUMENTS

| | | | |
|---|---|---|---|
| 8,757,148 B2* | 6/2014 | Montgomery | A61M 16/12 |
| | | | 128/205.24 |
| 11,406,944 B2* | 8/2022 | Danieli | B67D 1/0057 |
| 2009/0078321 A1 | 3/2009 | Arnott et al. | |
| 2011/0056472 A1* | 3/2011 | Stone | F17C 13/04 |
| | | | 220/581 |
| 2012/0181287 A1* | 7/2012 | Holbeche | G05D 16/103 |
| | | | 220/582 |
| 2013/0213492 A1* | 8/2013 | Newman | F16K 1/306 |
| | | | 137/511 |

FOREIGN PATENT DOCUMENTS

| | | |
|---|---|---|
| DE | 202021105982 U1 | 2/2022 |
| EP | 0050947 A2 * | 5/1982 |
| EP | 2 236 905 A1 | 10/2010 |
| WO | 2020055849 A1 | 3/2020 |
| WO | WO 2021/099542 A1 | 5/2021 |

OTHER PUBLICATIONS

Germany Office Action, mailing date Sep. 30, 2022 for corresponding German Application No. DE 10 2021 132 643.5 with English translation (5 pages).

Extended European Search Report, dated Apr. 28, 2023 for corresponding European Application No. 22 212 510.6 with English translation (10 pages).

Canadian Intellectual Property Office, Search Report in Application No. CA 3,184,936, dated May 28, 2024, 5 pages.

* cited by examiner

PRESSURE VESSEL AND METHOD FOR FILLING IT

CROSS-REFERENCE TO RELATED APPLICATION

This application claims priority to German application no. DE 10 2021 132 643.5 filed on Dec. 10, 2021, which is hereby incorporated by reference in its entirety.

FIELD OF INVENTION

The invention relates to a pressure vessel and a method for filling the same.

BACKGROUND

A pressure vessel and a method of manufacturing a pressure vessel are known from the prior art, as described in WO 2021/099542 A1. The pressure vessel comprises a vessel body having a vessel bottom arranged at a lower end and formed integrally with the vessel body, an end piece arranged at an upper end of the vessel body and formed integrally with the vessel body and having an opening, a connection geometry arranged externally on a wall surrounding the opening of the end piece, the wall with the connection geometry forming a connection which is set up to be or become coupled in a media-tight manner to a corresponding further connection, a fastening structure, formed on the inside of the wall surrounding the opening of the end piece, for a valve, and a pressure relief device arranged in a pressure relief opening of the end piece or a pressure relief opening of the vessel body.

SUMMARY

The object of the invention is to provide a novel pressure vessel and a method for filling it.

The object is achieved according to the invention by a pressure vessel with the features of claim 1 and a method for filling it with the features of claim 14.

Advantageous embodiments of the invention are the subject of the dependent claims.

A pressure vessel comprises at least a vessel body (also called container body or pressure body) having an opening. At an upper end of the vessel body, an end section is integrally formed with the vessel body. This end region, which is formed integrally with the vessel body, can also be referred to as an end piece. The end section has the opening. Furthermore, the pressure vessel has a valve which is arranged in the end region.

According to the invention, at least two outflow openings are formed in the wall surrounding the opening of the end region below the opening, in particular opposite each other. In an outflow position of the valve, the outflow openings are fluidically connected via the valve to a body interior (also called container interior) of the vessel body and the opening of the end region is closed in a media-tight manner. In a filling position of the valve, the opening of the end region is fluidically connected via the valve to the body interior of the vessel body.

In a method for filling the pressure vessel according to the invention, the pressure vessel is arranged in a filling device. In this process, it can be provided that the outflow openings are closed from the outside in a media-tight manner. The valve is then moved into the filling position and the pressure vessel is filled via the opening of the end section, in particular via a filling opening in a lid and a passage opening in a valve body of the valve. In this case, the medium-tight closure of the discharge openings prevents the medium with which the pressure vessel is filled from escaping via the discharge openings. Alternatively, it can be provided, for example, that the pressure vessel is filled via the opening of the end section and additionally via the outflow openings. In this case, the outflow openings are thus not closed in a media-tight manner, but are coupled to the filling device for filling. Alternatively, it can be provided, for example, that the pressure vessel is filled only via the outflow openings. In this case, the outflow openings are thus not closed in a media-tight manner, but are coupled with the filling device for filling. Furthermore, for this purpose the valve is moved into the outflow position, in which the outflow openings are fluidically connected via the valve to the body interior of the vessel body, so that filling of the vessel body via the outflow openings is enabled, and the opening of the end region is closed in a media-tight manner, so that the escape of the medium with which the vessel body is filled is prevented via the opening of the end region.

The pressure vessel, for example pressurized gas vessel, enables integration of the valve or a valve function into the end region and, in particular, direct media-tight coupling of the pressure vessel with a further connection, for example a connection of an application or a connection of the filling device.

In contrast to the prior art, the solution according to the invention allows a lateral outflow of a medium, for example gas, for example carbon dioxide, located in the vessel body. In this case, the medium flows through the valve, in particular axially through the valve and axially out of the valve, and then through the two outflow openings in the wall out of and into the application. The solution according to the invention is therefore particularly suitable for applications in which such lateral outflow is required.

In contrast to other solutions in which the valve protrudes from the vessel body, thereby enabling lateral outflow from the valve, the solution according to the invention achieves a smaller overall height, since the valve can be or is arranged almost completely in the vessel body. For example, only a collar-shaped upper lid section of a lid protrudes from the vessel body, which bears sealingly against an end face of the wall of the end region. Furthermore, the solution according to the invention requires fewer seals than in the prior art.

The solution according to the invention also enables the pressure vessel to be filled via the opening in the end region, allowing, for example, faster filling than via the outflow openings. The solution according to the invention prevents the medium from escaping from the pressure vessel via the opening in the end region during actuation of the valve in the application. For this purpose, it is provided in particular that the valve of the pressure vessel, when arranged in the application, can be moved by means of the application from a closed valve position only into the outflow position, in which the opening of the end region continues to be closed in a media-tight manner, so that an outflow of the medium via the opening of the end region is prevented. Thus, in the outflow position of the valve, the medium can only flow out via the outflow openings. To fill the pressure vessel, it is inserted into the filling device, by means of which the valve can be moved into the filling position. This enables the pressure vessel to be filled via the opening in the end region that is released in the filling position.

The valve is screwed into the end region, for example. It is designed as a check valve or non-return valve, for example.

In one possible embodiment, the valve has a valve body with a passage opening in which a valve plunger is arranged, which closes the passage opening in a fluid-tight manner in the closed valve position of the valve and opens the passage opening in the outflow position and in the filling position of the valve. Thus, in the outflow position, the outflow of the medium via the valve, in particular its passage opening, and the outflow openings fluidically connected thereto is enabled, and in the filling position, the filling of the pressure vessel with the medium via the opening of the end piece and the passage opening, which is then opened by means of the valve, is enabled.

In a possible embodiment, the valve has a support element connected to the valve body or formed on the valve body and a spring element arranged inside the valve body, which spring element is attached with a first end to the support element and with an opposite second end indirectly, for example via a housing, or directly, in particular directly, on the valve plunger. The spring element is tensioned, in particular compressed, during a movement of the valve plunger from the closed valve position into the outflow position, and is further tensioned, in particular further compressed, during a movement of the valve plunger from the outflow position into the filling position.

In one possible embodiment, a lid is provided, which is arranged above the valve body and above the outflow openings in the end region. The lid has a filling opening in which an actuating plunger is arranged.

A lower side of the actuating plunger rests or bears against an upper side of the valve plunger and/or is connected thereto. The actuating plunger closes the filling opening in a media-tight manner in the outflow position of the valve and releases the filling opening in the filling position of the valve. This enables the actuation of the valve plunger and the media-tight closing of the opening of the end region in the outflow position of the valve. The valve plunger can thus be actuated by means of the actuating plunger, in particular can be moved from the closed valve position into the outflow position and further into the filling position, in particular by appropriately pressing down the actuating plunger and thereby also the valve plunger.

For actuation in an application, the actuating plunger and thereby the valve plunger is moved by means of the application, for example by means of an actuating unit of the application, only so far, in particular moved downward, until the outflow position is reached. As a result, the medium flows out of the interior of the container via the two outflow openings from the vessel body and into the application. An outflow of the medium via the opening in the end area is prevented by the lid and the actuating plunger, which in the outflow position closes the filling opening in the lid in a medium-tight manner.

For filling the pressure vessel, when the pressure vessel is arranged in the filling device, the actuating plunger and thereby the valve plunger, in particular by means of a corresponding unit of the filling device, are moved further beyond the outflow position, in particular further downwards, into the filling position, as a result of which the passage opening and also the filling opening are now uncovered. In particular, for filling, the outflow openings are closed from the outside in a media-tight manner Filling thus takes place via the filling opening and the passage opening. The medium with which the pressure vessel is filled by the filling device flows through these openings into the interior of the vessel.

Valve plunger and actuating plunger are designed, for example, as separate components or together as a one-piece and/or one-piece component.

The lid and the valve body are designed as separate components, for example. In this case, it is provided in particular that the lid is arranged at a distance from the valve body in order to allow the medium to flow via the passage opening to the outflow openings in the outflow position of the valve.

In another possible embodiment, the lid and the valve body are formed together, for example, as a one-piece and/or one-piece component. The valve body then has, for example, one, in particular exactly one, connection opening which is formed radially from an inner side in the direction of an outer side of the valve body. This enables simple manufacture of the valve body. In addition, the valve body is particularly stable, since it has only a single connection opening, thus avoiding additional weakening caused by multiple connection openings. The valve body can therefore be formed, for example, with a lower material cost and/or from a different, in particular less expensive, material, for example aluminum or brass.

In other embodiments, the valve may have a plurality of such connection openings, each of which is formed radially from the inside toward the outside of the valve body.

The connecting opening or the respective connecting opening in the valve body is positioned in particular at the level of the outflow openings in the end region. This ensures short flow paths between the connecting opening in the valve and the two outflow openings.

Alternatively, the connecting opening or the respective connecting opening can also be positioned offset in height from the height of the outflow openings in the end region.

For example, the connecting opening opens into a distributor groove formed circumferentially on the outside of the valve body in the latter and/or an inner opening edge of the respective outflow opening is arranged on a groove bottom of a circumferential distributor groove formed on the inside of the wall of the end region. This ensures uniform distribution of the medium flowing out of the one connection opening in the valve body to the two outflow openings in the wall of the end section and thus uniform outflow of the medium from both outflow openings.

If the connecting opening or the respective connecting opening is positioned offset in height from the height of the outflow openings in the end region, for example, the distributor groove is formed with a corresponding width, or a connecting channel is provided between the connecting opening or the respective connecting opening and the distributor groove, or another fluidic connection is provided between the connecting opening or the respective connecting opening and the distributor groove.

In one possible embodiment, a mounting structure for the valve is provided, formed on an inside of a wall surrounding the opening of the end region. In particular, it has an internal thread arranged on the inside of the wall. In one possible embodiment, the valve, i.e. in particular the valve body and/or the lid, has an external thread corresponding to the internal thread of the fastening structure. In the state screwed into the internal thread, in particular completely screwed in, i.e. up to a predetermined end position, the valve is arranged in the region of the opening of the end region, projects into the end region starting from the opening and rests, in particular with the lid, against the end region in a media-tight manner.

The design of the valve with the valve components held inside or on the valve enables particularly simple assembly of the valve as a whole or in just two parts, namely valve body with its components and lid with its components, in the end region. Since the valve does not have a retaining function, in contrast to solutions known from the prior art with a separate valve arranged on the outside of the end area, the valve can be significantly weaker in terms of its material thickness and material quantity.

For example, at least one seal, for example in the form of an O-ring or a shaft seal, is arranged between the valve body and the end region and/or between the lid and the end region. In this case, the seal on the valve body is arranged in particular below the outflow openings and the seal on the lid is arranged above the outflow openings. This prevents the medium from flowing out of the interior of the container when the valve is in the closed position, and prevents the medium from flowing out of the opening of the end section when the valve is in the outflow position. In a possible embodiment, a seal is also arranged between the valve body and the valve plunger and/or between the lid and the actuating plunger in each case, for example in each case in the form of an O-ring or a shaft seal. These seals are very reliable and available at low cost.

In one possible embodiment, the support element and/or the valve body have an inflow opening. This allows the medium to flow out of the interior of the container through the valve body to the passage opening and through this in the outflow position of the valve. In addition, this allows the medium to flow into the interior of the container through the passage opening, the valve body and the inflow opening during filling of the vessel body in the filling position and also in the outflow position.

In particular, the vessel body has a vessel bottom arranged at a lower end and formed integrally with the vessel body. In particular, the one-piece design of the entire vessel body, including the vessel bottom and end region, achieves particularly high pressure stability with little effort, in particular with little material effort, since joints, for example weld seams, which represent weak points, are avoided.

The vessel body has, in particular, a connection geometry arranged on the outside of a wall surrounding the opening of the end region, for example an external thread, a latching arrangement or a quick-release fastener, the wall forming with the connection geometry a connection which is set up to be or is coupled in a media-tight manner to a corresponding further connection, in particular a connection of an application or a connection of the filling device. Due to the design of the connection geometry, for example a so-called ACME thread, at the end region, the valve can be omitted as a separate component. Compared with solutions known from the prior art with a separate valve, this means that a number of individual parts can be reduced, and a valve body made of brass, for example, can be omitted or at least significantly thinner in terms of its material thickness and material quantity. This means that material and cost requirements can be significantly reduced. For example, a saving in brass of up to 200 g per pressure vessel with valve can be achieved.

Furthermore, due to the design of the connection geometry at the end area and thus at the pressure vessel, reliable and improved media tightness can be achieved, which results in particular from a reduction in a number of joints and their sealing compared to solutions known from the prior art with a separate valve. Furthermore, an assembly effort is reduced.

Also, a seal provided in the prior art for sealing the valve against the pressure vessel, in particular a so-called O-ring, can be omitted, which also results in a reduction in the number of individual parts and a cost reduction.

Due to the integration of the valve into the pressure vessel and the formation of the external thread at the end area, the valve no longer needs to be formed from brass. For example, both the pressure vessel, i.e. the vessel body with vessel bottom and the end area, and the components of the valve are formed from aluminum. On the one hand, this leads to the advantage that particularly low costs can be achieved and, on the other hand, that at least all components responsible for media tightness are formed from the same material with the same coefficient of thermal expansion, and thus different expansions and consequent leaks with temperature changes are avoided. Also, when the components of the valve and the pressure vessel are formed, simple and complete recycling is possible. Alternatively, the valve is formed of brass or another material, for example.

In one possible embodiment, the pressure vessel has an overpressure protection. For example, this overpressure protection is arranged in the valve. Alternatively, this overpressure protection is arranged, for example, in the vessel bottom, in particular in an overpressure opening formed in the vessel bottom. With a corresponding design of the vessel bottom, for example with a corresponding recess, this enables an integrated arrangement of the overpressure protection without it protruding over an outer edge of the vessel body. This increases protection against mechanical damage to the overpressure protection. Furthermore, a required installation space for accommodating the pressure vessel in an application can be reduced and an assembly of the pressure vessel in the installation space is simplified.

For example, the overpressure protection device includes a rupture disc or bursting disc. For example, an overpressure channel is formed extending through the valve plunger and the actuating plunger, which is closed in a media-tight manner by the bursting disc. For example, the bursting disc is arranged on the valve plunger at an end of the overpressure channel facing the interior of the container and is held on the valve plunger by the housing, for example. Alternatively, the bursting disc is secured, for example, in the valve or in the vessel bottom by a screw comprising a venting bolt. Such a design of the overpressure protection, in particular by means of a bursting disc, is particularly simple, inexpensive and reliable. For example, the overpressure protection is designed for a release pressure of 250 bar. However, any other triggering pressure values are also possible.

For example, the bursting disc is fluidically coupled to an interior of the pressure vessel, i.e. to the vessel interior. For example, it is held at the edge by the screw, inside which a venting bolt is formed or arranged, or held by the housing and the valve plunger with an overpressure channel formed therein. If the trigger pressure is exceeded, the bursting disc is mechanically destroyed and releases a fluidic connection between the venting bolt or the overpressure channel and the body interior, so that the medium, for example gas, located in the body interior can escape.

In particular, when the overpressure protection device is arranged in the vessel bottom, the overpressure opening comprises, for example, an internal thread corresponding to an external thread of the bolt, into which the bolt is screwed. This enables particularly simple and secure fastening of the overpressure protection device. For example, the internal thread is produced by machining. However, the internal thread can also be produced in a forming process, for example a roll forming process, during the forming of the vessel bottom. Alternatively, other processes for producing the internal thread are also possible.

In a process for manufacturing a pressure vessel described above, the vessel body and the end region are produced together, for example, from a material blank in a roll forming process. Furthermore, the fastening structure for the valve and in particular also the connection geometry are produced, for example, by means of machining and/or forming, in particular during the roll forming process, and/or application of material and/or other suitable processes in the region of the end region. Furthermore, the two outflow openings are formed in the wall of the end region. Subsequently, the valve is attached to the end region in the area of the opening, in particular screwed in. If the valve body with its components and the lid with its components are formed as separate components, for this purpose in particular first the valve body is fastened, in particular screwed in, in the region of the opening at the end region and then the lid is fastened, in particular screwed in, in the region of the opening at the end region. The pressure vessel can be produced particularly easily and with high quality by means of the roll forming process. The generation of the fastening structure and the fastening of the valve are also particularly simple, reliable and can be realized at low cost.

In one possible embodiment of the process for producing the pressure vessel, the overpressure opening is created in the vessel base by means of machining and/or forming, in particular during the roll forming process, and/or application of material and/or other suitable processes, and the overpressure protection is then fastened to the overpressure opening. The generation of the overpressure opening and the fastening of the overpressure protection device are particularly simple, reliable and can be realized at low cost.

BRIEF DESCRIPTION OF THE DRAWINGS

Examples of embodiments of the invention are explained in more detail below with reference to drawings.

Corresponding parts are marked with the same reference signs in all figures.

DETAILED DESCRIPTION OF SPECIFIC EMBODIMENTS

Figure 1:
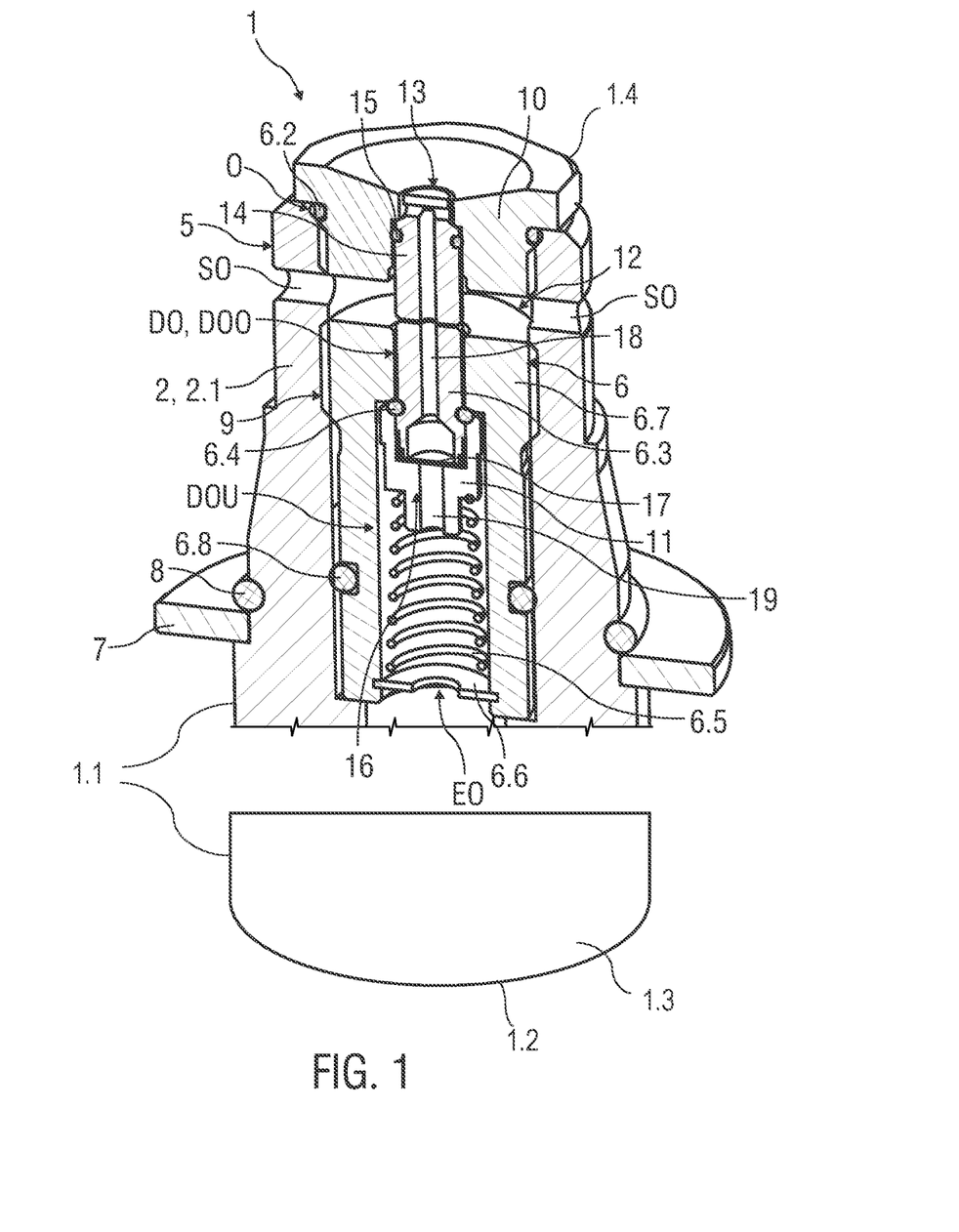
FIG. 1 schematically shows a longitudinal sectional perspective view of a pressure vessel with a valve in a closed valve position, FIG. 2 schematically shows a longitudinal sectional view of the pressure vessel with the valve in the closed valve position, FIG. 3 schematically shows a perspective longitudinal sectional view of the pressure vessel with the valve in an outflow position, FIG. 4 schematically shows a longitudinal sectional view of the pressure vessel with the valve in the outflow position, FIG. 5 schematically shows a longitudinal sectional view of the pressure vessel with the valve in a filling position, and FIG. 6 schematically shows a longitudinal sectional view of the pressure vessel with the valve in the filling position.
Figure 2:
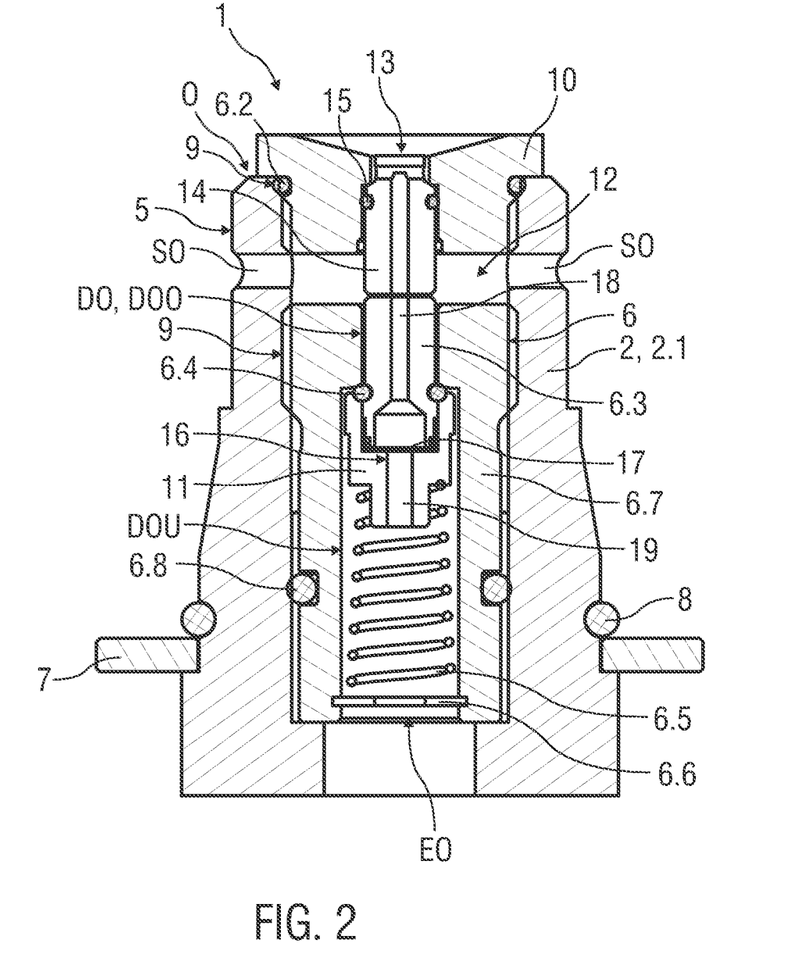
Figure 3:
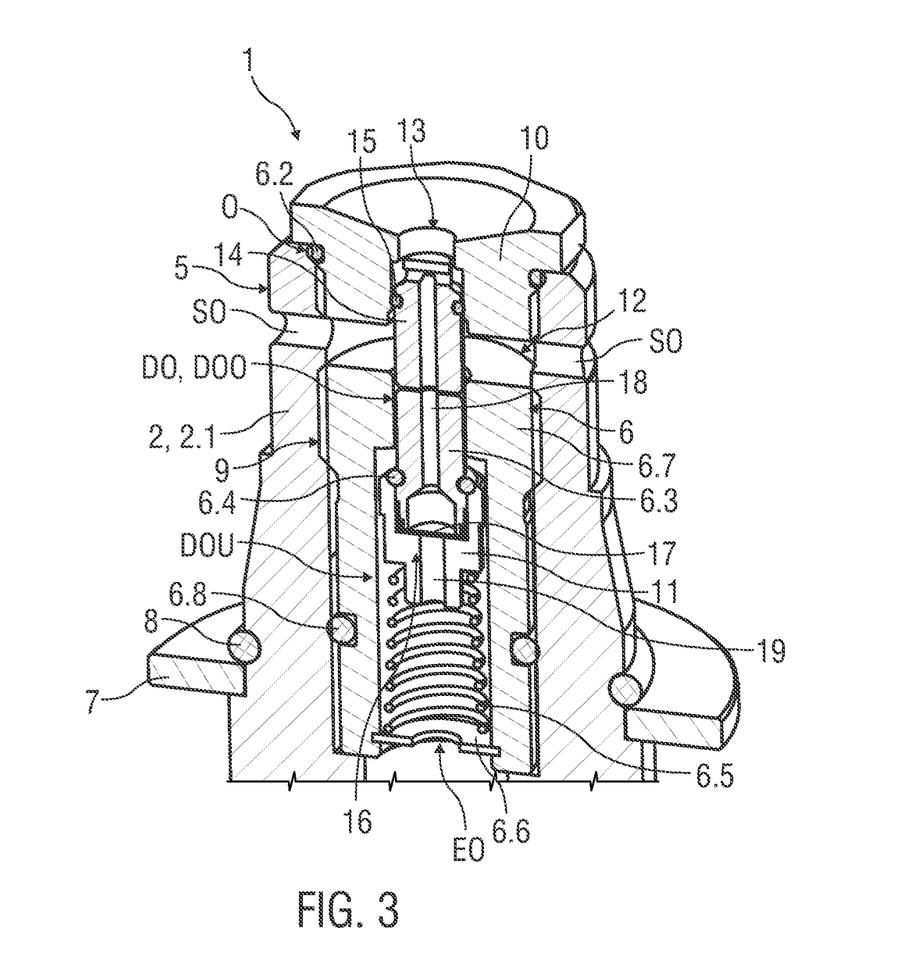
Figure 4:
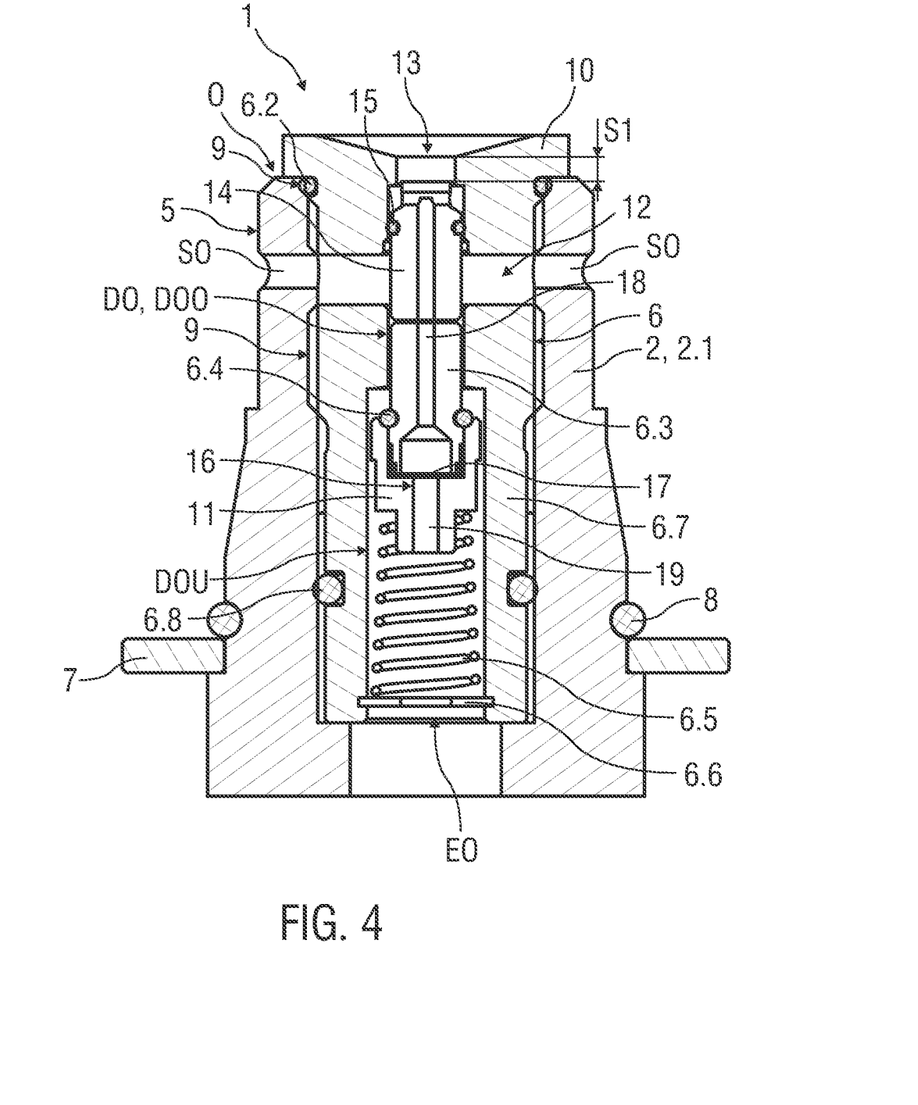
Figure 5:
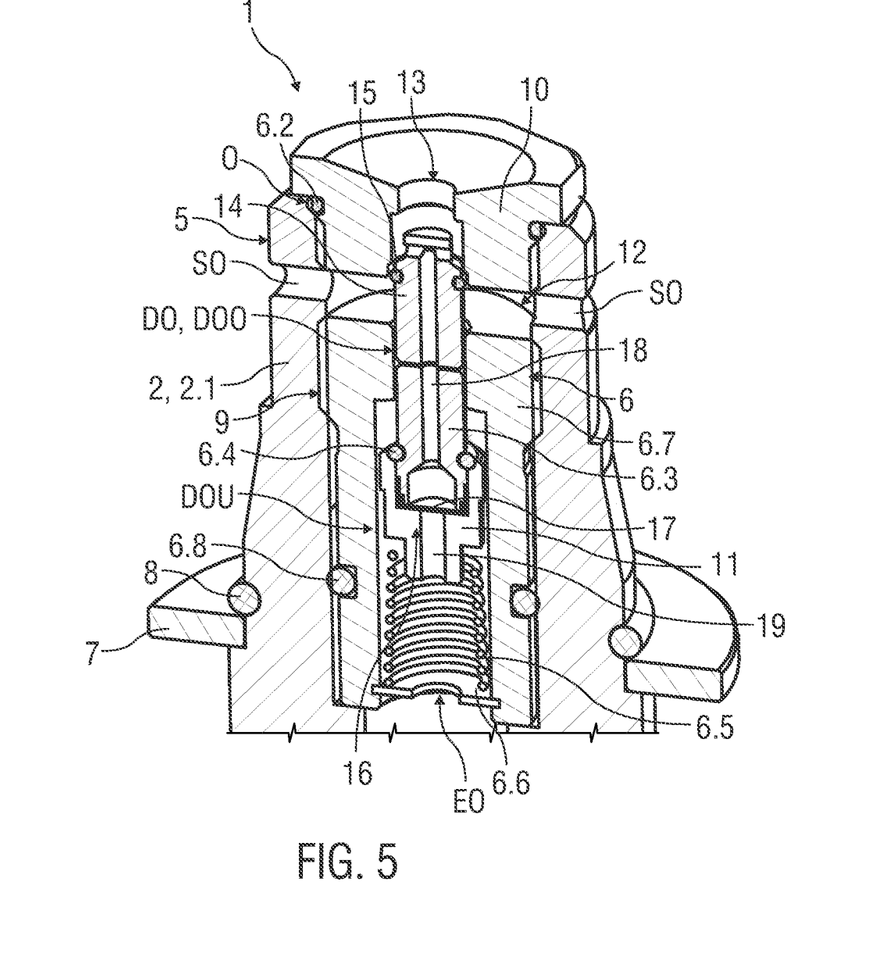
Figure 6:
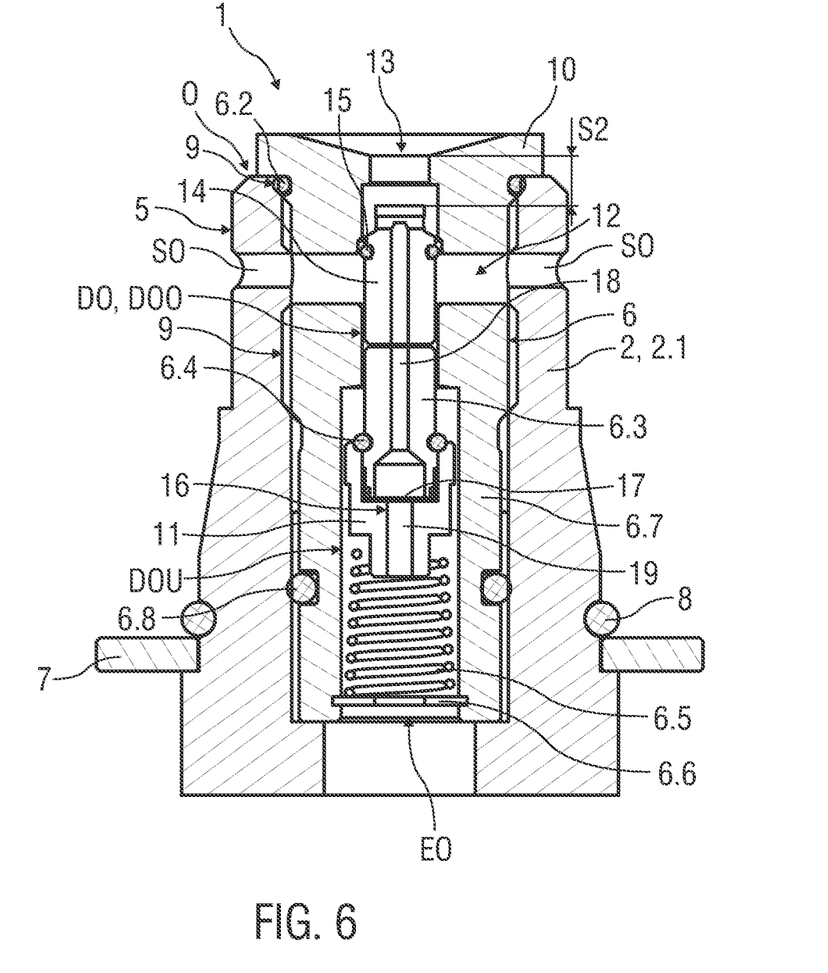

FIGS. 1 to 6 show an exemplary embodiment of a pressure vessel 1, comprising a valve 6. FIGS. 1 and 2 show the pressure vessel 1 in a closed valve position of the valve 6, FIGS. 3 and 4 show the pressure vessel 1 in an outflow position of the valve 6, and FIGS. 5 and 6 show the pressure vessel 1 in a filling position of the valve 6. The pressure vessel 1 is shown in FIGS. 2, 4 and 6 each in a longitudinal sectional view and in FIGS. 1, 3 and 5 each in a perspective longitudinal sectional view.

For example, the pressure vessel 1 is a pressurized gas vessel and is configured to contain a gas under high pressure. For example, the pressure vessel 1 is a so-called gas cartridge.

The pressure vessel 1 has the vessel body 1.1 with a vessel bottom 1.2 arranged at a lower end 1.3 of the pressure vessel 1 and, in particular, formed integrally with the vessel body 1.1.

At an upper end 1.4 and thus opposite the vessel bottom 1.2, the vessel body 1.1 has an end region 2 which is in particular formed integrally with the vessel body 1.1. The end region 2 has an opening O.

The vessel bottom 1.2, the vessel body 1.1 and the end region 2 are formed in particular as a homogeneous, one-piece component without joints and are produced together in a forming process, for example a roll forming process, from a material blank, for example an aluminum blank or another material.

For a media-tight coupling of the pressure vessel 1 with an application and/or a filling device, the latter has, for example, a connection geometry 5 introduced on the outside at a wall 2.1 surrounding the opening O of the end region 2, which is formed, for example, as an external thread, for example as a so-called ACME thread. Thereby, the wall 2.1, in particular comprising the connection geometry 5, forms a connection which is set up to be or to be coupled in a media-tight manner with a corresponding further connection of the corresponding application or the filling device. The connection geometry 5 is created, for example, during the forming of the end region 2 in the forming process and/or by means of machining after forming and/or by applying material and/or other suitable processes.

The pressure vessel 1 also advantageously has the valve 6, which is designed in particular as a check valve. This valve 6 is arranged, at least essentially, inside the end area 2. For this purpose, the pressure vessel 1 has a fastening structure 9 for the valve 6 formed on the inside of the wall 2.1 surrounding the opening O of the end region 2. In particular, the fastening structure 9 has an internal thread arranged on the inside of the wall 2.1. The valve 6, in the example shown a valve body 6.7 of the valve 6 and a lid 10 formed separately thereto in the example shown, has an external thread corresponding to the internal thread of the fastening structure 9.

In the illustrated example, the valve 6 comprises the valve body 6.7 and the lid 10, which is arranged with an upper collar-shaped lid section at the opening O of the end portion 2. Starting from the opening O and from this collar-shaped cover section, the lid 10 projects into the end region 2. The valve body 6.7 is arranged below the lid 10 and, in the example shown, spaced therefrom in the end region 2.

The valve body 6.7 and the lid 10 each lie against the end region 2 in a media-tight manner. For this purpose, a diameter of the upper collar-shaped lid section is larger than an opening diameter of the opening O of the end region 2, whereby an abutment surface facing the end region 2 is formed on the upper collar-shaped lid section and abuts against an end face of the end region 2. In addition, a seal 6.2, in particular designed as an O-ring or shaft seal, is arranged between the lid 10 and the end region 2. In particular, this lies against the lid 10 in a transition region between the upper collar-shaped lid section and the section of the lid 10 adjoining therebelow and projecting into the end region 2 and, in an opening edge region, lies against the inside of the wall 2.1 of the end region 2 surrounding the opening O of the end region 2. In the examples shown, it is arranged in a receiving groove of the lid 10. Furthermore, a seal 6.8, in particular designed as an O-ring or shaft seal, is also arranged between the valve body 6.7 and the end region 2. In the example shown, it is arranged in a receiving groove in the valve body 6.7 and thus lies in sealing contact with the valve body 6.7 and also with the end region 2.

The valve body 6.7 and/or the lid 10 are each formed of aluminum or brass or another material, for example.

The valve body 6.7 has a passage opening DO extending in the axial direction of the valve body 6.7 and penetrating the latter. This passage opening DO has an upper section DOO and an adjoining lower section DOU, the upper section DOO having a smaller diameter than the lower section DOU. The valve 6 further comprises a valve plunger 6.3. The valve plunger 6.3, which is shown in FIGS. 1 and 2 in the closed valve position, is arranged in the upper section DOO of the passage opening DO and closes it in a fluid-tight manner.

In the outflow position of the valve 6 shown in FIGS. 3 and 4 and in the filling position of the valve 6 shown in FIGS. 5 and 6, the valve plunger 6.3 releases the upper section DOO of the passage opening DO. In order to enable this valve function, i.e. the media-tight closing in the closed valve position and the releasing in the outflow position and in the filling position, a seal 6.4, in particular designed as an O-ring or shaft seal, is arranged between the valve plunger 6.3 and the valve body 6.7.

In the illustrated example, a housing 11 positioned in the lower section DOU of the passage opening DO is arranged at a lower end of the valve plunger 6.3, wherein a diameter of the housing 11, at least in an upper section that circumferentially surrounds the valve plunger 6.3 on the outside, is larger than a diameter of the valve plunger 6.3 and also larger than a diameter of the upper section DOO of the passage opening DO. As a result, in the closed valve position, the housing 11 of the valve plunger 6.3 abuts with its upper surface radially projecting from the valve plunger 6.3 against an upper surface of the lower section DOU of the passage opening DO radially projecting from the upper section DOO of the passage opening DO, with the seal 6.4 interposed therebetween. In the example shown, it is arranged in a receiving groove formed in the valve plunger 6.3 and in its housing 11. The valve plunger 6.3 is formed, for example, from aluminum or brass or another material.

The lid 10 has a filling opening 13 in which an actuating plunger 14 is arranged, a lower side of the actuating plunger 14 resting against and/or being connected to an upper side of the valve plunger 6.3. In the outflow position of the valve 6, the actuating plunger 14 closes the filling opening 13 in a media-tight manner, in the example shown likewise in the closed valve position, and releases the filling opening 13 in the filling position of the valve 6. This enables the actuation of the valve plunger 6.3 and the media-tight closing of the opening O of the end section 2 in the outflow position of the valve 6. The valve plunger 6.3 can thus be actuated by means of the actuating plunger 14, in particular can be moved from the closed valve position shown in FIGS. 1 and 2 into the outflow position shown in FIGS. 3 and 4, in particular can be moved downwards, and can be moved further, in particular further downwards, into the filling position shown in FIGS. 5 and 6, in particular by pressing down the actuating plunger 14 and thereby also the valve plunger 6.3 accordingly.

A seal 15 is provided between the actuating plunger 14 and the lid 10 to close the filling opening 13 in a media-tight manner by means of the actuating plunger 14. In the example shown, this seal 15 is arranged in a receiving groove of the actuating plunger 14 and thus moves together with the actuating plunger 14. In the closed valve position and in the outflow position, this seal 15 is located in an upper narrow region of the filling opening 13, thus lies against the actuating plunger 14 and against an opening wall of the filling opening 13 in a sealing manner and thus seals the filling opening 13 in a media-tight manner, as shown in FIGS. 1 to 4. In the filling position, the actuating plunger 14 is moved downward to such an extent that the co-moved seal 15 is located in a lower wider region of the filling opening 13, which has a larger diameter than the upper region of the filling opening 13. As a result, the seal 15 no longer lies sealingly against the opening wall of the filling opening 13, as a result of which the filling opening 13 is uncovered in the filling position.

In the end region 2 of the vessel body 1.1, two outflow openings SO are formed opposite one another, each extending from an outer side to an inner side of the wall 2.1. They are arranged below the opening O. In the example shown, the valve body 6.3 is arranged at a distance from the lid 10. The lid 10 is arranged above the valve body 6.7 and, in the example shown, also above the outflow openings SO in the end region 2. In this case, valve body 6.7 and lid 10 are arranged in such a way that a free space 12 is formed between valve body 6.3 and lid 10, into which the medium can flow from the interior of the vessel body 1.1 when the valve 6 is in the outflow position. The outflow openings SO and the free space 12 are arranged at the same height in the example shown. This refers to the valve 6 arranged in the end region 2 in a predetermined end position, i.e. to the valve 6 properly connected to the vessel body 1.1, comprising the valve body 6.7 and the lid 10. In other embodiments, the height positions of the outflow openings SO and the free space 12 may differ. However, a fluidic connection is then provided between the free space 12 and the outflow openings SO.

For actuation in an application, the actuating plunger 14 and thereby the valve plunger 6.3 are moved by means of the application, for example by means of an actuating unit of the application, only until the outflow position shown in FIGS. 3 and 4 is reached, in particular downwards. The actuating plunger 14, and thus the valve plunger 6.3, is thus moved by a first actuation path S1 (actuating path/travel) from the closed valve position shown in FIGS. 1 and 2 to the outflow position shown in FIGS. 3 and 4, in particular moved downward, i.e. moved toward the vessel bottom 1.2 of the pressure vessel 1. In this outflow position of the valve 6, the outflow openings SO are fluidically connected to the body interior of the vessel body via the valve 6, and the opening O of the end region 2 is closed in a media-tight manner, in particular by the lid 10 and the actuating plunger 14. As a result, the medium, in particular a gas, flows out of the body interior via the passage opening DO into the free space 12 and via the two outflow openings SO out of the vessel body 1 and into the application connected to the vessel body 1.1. Outflow of the medium via the opening O in the end region 2, in particular via the filling opening 13, is prevented by the lid 10 and the actuating plunger 14, which in the outflow position closes the filling opening 13 in the lid 10 in a medium-tight manner.

For filling the pressure vessel 1, when the pressure vessel 1 is arranged in the filling device, the actuating plunger 14 and thereby the valve plunger 6.3 are moved further, in particular further downwards, beyond the outflow position into the filling position shown in FIGS. 5 and 6, in particular by means of a corresponding unit of the filling device. The actuating plunger 14, and thus the valve plunger 6.3, is thus moved by a second actuation path S2, which is greater than the first actuation path S1, from the closed valve position shown in FIGS. 1 and 2 into the filling position shown in FIGS. 5 and 6, in particular moved downwards, i.e. moved towards the vessel bottom, as a result of which the passage opening DO and also the filling opening 13 are now uncovered. In the filling position of the valve 6, the opening O of the end area 2 is thus fluidically connected to the body interior of the vessel body via the valve 6, in particular via the passage opening DO and the filling opening 13 and, in the example shown, via the free space 12 between them.

In particular, for filling, the outlet openings SO are closed from the outside in a media-tight manner Filling thus takes place via the filling opening 13 and the outlet opening DO. The medium with which the pressure vessel 1 is filled by the filling device thus flows from the filling device via the filling opening 13 first into the free space 12 and from here, since the outflow openings SO are closed in a media-tight manner from the outside, via the passage opening DO into the interior of the vessel.

In a method for filling the pressure vessel 1, the pressure vessel 1 is thus arranged in a filling device. In this process, it can be provided that the outlet openings SO are closed in a media-tight manner from the outside. The valve 6 is then moved into the filling position, i.e. in particular the actuating plunger 14 and thereby the valve plunger 6.3 are moved into the filling position, in particular by means of a corresponding unit of the filling device. This is done from the closed valve position by a correspondingly large movement over the second actuation path S2, in particular downwards. The pressure vessel 1 is then filled via the opening O of the end region 2, more precisely in the example shown via the filling opening 13 and the passage opening DO and in the example shown via the free space 12 located therebetween. In this case, the medium-tight closure of the outlet openings SO prevents the medium with which the pressure vessel 1 is filled from escaping via the outlet openings SO.

Alternatively, it can be provided, for example, that the pressure vessel 1 is filled in the manner described above via the opening O of the end region 2, more precisely via the filling opening 13 and the passage opening DO and, in the example shown, via the free space 12 located therebetween, and additionally via the outflow openings SO. In this case, the outflow openings SO are thus not closed in a mediumtight manner, but are likewise coupled to the filling device for filling. The medium with which the pressure vessel 1 is filled by the filling device thus flows from the filling device via the filling opening 13, in the example shown via the free space 12, and via the passage opening DO into the interior of the vessel and additionally via the outflow openings SO, in the example shown additionally via the free space 12, and via the passage opening DO into the interior of the vessel.

Alternatively, it can be provided, for example, that the pressure vessel 1 is filled only via the outflow openings SO. In this case, the pressure vessel 1 is thus arranged in the filling device and the outflow openings SO are not closed in a media-tight manner, but are coupled to the filling device for filling. Furthermore, for this purpose the valve 6 is not moved into the filling position, but only into the outflow position, i.e. in particular the actuating plunger 14 and thereby the valve plunger 6.3 are moved into the outflow position, i.e. moved downwards from the closed valve position less, in particular only by the first actuation path S1, so that the filling position is not reached. This movement is again carried out in particular by means of a corresponding unit of the filling device. The pressure vessel 1 is now filled via the outflow openings SO, more precisely in the example shown via the outflow openings SO and the passage opening DO and in the example shown via the free space 12 located therebetween. In the outflow position, the opening O of the end region 2, in particular the filling opening 13, is closed in a media-tight manner, in particular by the actuating plunger 14, so that the escape of the medium with which the pressure vessel 1 is filled is prevented via this opening O of the end region 2, in particular via the filling opening 13.

The valve 6 further comprises a spring element 6.5, for example a helical spring, which presses the valve plunger 6.3 upwards in the axial direction, i.e. in the direction of the opening O, and thus against the valve body 6.7, wherein the spring element 6.5 in the example shown is compressed during a movement of the valve plunger 6.3 from the closed valve position into the outflow position and further into the filling position. For this purpose, the spring element 6.5 rests with one spring end on the housing 11 of the valve plunger 6.3 in the example shown.

To support the spring element 6.5 at a spring end facing away from the valve plunger 6.3, the valve 6 has a support element 6.6 which is connected to the valve body 6.7. In the example shown, it is designed as a disc that is inserted into the valve body 6.7.

The spring element 6.5 is thus arranged inside the valve body 6.7, more precisely in the lower section DOU of the passage opening DO, and is supported with its first spring end on the support element 6.6 and with its opposite second end on the valve plunger 6.3. In the example shown, it is only indirectly supported on the valve plunger 6.3, namely via the housing 11 of the valve plunger 6.3.

To allow the medium to flow through the valve 6 out of and into the interior of the container, the support element 6.6 and the valve body 6.7 have an inflow opening EO. In the example shown, the support element 6.6, which is designed as a disc, is arranged in the region of the inflow opening EO of the valve body 6.7 and has a central recess as the inflow opening EO.

On the outside of the end section 2, a stop disc 7 is arranged below the connection geometry 5 or is formed integrally with the vessel body. This stop disc 7 forms, for example, an end stop for coupling the pressure vessel 1 to the application and/or to the filling device, for example by screwing the pressure vessel 1 into the application or into the filling device. In order to prevent an outflow past the end region 2 on the outside, a seal 8, in particular designed as an O ring or shaft seal, is provided above the stop disc 7. In the example shown, it is arranged in a receiving groove in the end region 2 above the stop disc 7 and thus lies against the end region 2 in a sealing manner. In the state of the pressure vessel 1 coupled with the application or with the filling device, it is also in sealing contact with a corresponding contact area of the application or of the filling device.

In the illustrated example, pressure vessel 1 further comprises an overpressure protection 16. This overpressure protection 16 is arranged in the valve 6 in the example shown. It comprises a bursting disc 17. In order to discharge medium from the interior of the container to reduce overpressure, an overpressure channel 18 is formed which runs through the valve plunger 6.3 and the actuating plunger 14 and is closed in a media-tight manner by the bursting disc 17. For this purpose, the bursting disc 17 is arranged on the valve plunger 6.3 at one end of the overpressure channel 18 facing the interior of the container and is held on the valve plunger 6.3 by the housing 11. On a side of the bursting disc 17 facing away from the overpressure channel 18, the housing 11 has a pressure opening 19, so that the bursting disc 17 is acted upon by a pressure prevailing in the interior of the container. In accordance with a design and corresponding construction of the bursting disc 17, it ruptures when the pressure in the interior of the container exceeds a predetermined value, i.e. when the overpressure is too high, and thus releases the overpressure channel 18. The medium in the vessel interior then flows out of the pressure vessel 1 via the overpressure channel 18, thereby relieving the overpressure and thus avoiding the risk of an explosion of the pressure vessel 1.

An outlet region of the overpressure channel 18 in the actuating plunger 14 is T-shaped in the example shown, i.e. the overpressure channel 18 does not open at the upper side of the actuating plunger 14, but in the upper region of the actuating plunger 14 radially in its circumferential wall. This prevents the actuating plunger 14 from being closed off, for example by the application, in particular by an actuating unit of the application acting on the actuating plunger 14. In order to ensure that the medium flows out via the overpressure channel 18, the upper region of the actuating plunger 14 is spaced apart from the opening wall of the filling opening 13, so that the medium can escape from the overpressure channel 18 and flow out between the actuating plunger 14 and the opening wall of the filling opening 13 after the bursting disc 17 has burst.

The filling opening 13 and the actuating plunger 14 each have a reduction in diameter in this upper region, as a result of which the actuating plunger 14 is held in the valve 6, i.e. cannot escape upwards out of the lid 10.

REFERENCE LIST 1 pressure vessel
1.1 vessel body
1.2 vessel bottom
1.3 lower end
1.4 upper end
2 end section
2.1 wall
5 connection geometry
6 valve
6.2 seal
6.3 sealing plunger
6.4 seal
6.5 spring element
6.6 support element
6.7 valve body
6.8 seal
7 stop disc
8 seal
9 fastening structure
10 lid
11 housing
12 free space
13 filling opening
14 actuating plunger
15 seal
16 overpressure protection
17 bursting disc
18 overpressure channel
19 pressure opening
DO passage opening
DOO upper section
DOU lower section
EO inflow opening
O opening
SO outlet opening
S1 first actuation path
S2 second actuation path What claimed is:

1. A pressure vessel, comprising at least:
a vessel body having an opening,
 wherein an end region of the vessel body is integrally formed at an upper end of the vessel body having a body wall, and
a valve disposed in the end region,
characterized in that
 at least two outflow openings are formed in the body wall surrounding the opening of the end region below the opening,
 in an outflow position of the valve, the outflow openings are fluidically connected via the valve to a body interior of the vessel body and the opening of the end region is closed in a media-tight manner, and
 in a filling position of the valve, the opening of the end region is fluidically connected via the valve to the body interior of the vessel body;
  characterized in that the two outflow openings are arranged opposite one another; and
  characterized in that the valve has a valve body with a passage opening in which a valve plunger is arranged, which in a closed valve position of the valve closes the passage opening in a media-tight manner and in the outflow position and in the filling position of the valve opens the passage opening.

2. The pressure vessel according to claim 1,
characterized in that the valve has a support element connected to or formed on the valve body and a spring element arranged inside the valve body and supported with a first end on the support element and with an opposite second end indirectly or directly on the valve plunger.

3. The pressure vessel according to claim 1,
characterized in that a fastening structure for the valve is provided on an inside of a wall surrounding the opening of the end region.

4. The pressure vessel according to claim 3,
characterized in that the fastening structure has an internal thread arranged on the inside of the wall.

5. The pressure vessel according to claim 4,
wherein the valve has an external thread corresponding to the internal thread of the fastening structure, and
wherein the valve, in a state screwed into the internal thread, being arranged in the region of the opening of the end region, projecting from the opening into the end region and bearing against the end region in a media-tight manner.

6. The pressure vessel according to claim 1,
characterized in that the vessel body has a vessel bottom arranged at a lower end and formed integrally with the vessel body.

7. The pressure vessel according to claim 1,
characterized in that the vessel body has a connection geometry arranged on the outside of the wall surrounding the opening of the end region, the wall forming with the connection geometry a connection which is set up to be or to be coupled in a media-tight manner to a corresponding further connection.

8. The pressure vessel according to claim 1,
characterized by an overpressure protection.

9. The pressure vessel according to claim 8,
characterized in that the overpressure protection is arranged in the valve or in a vessel bottom.

10. The pressure vessel according to claim 8,
characterized in that the overpressure protection has a bursting disc.

11. A method for filling a pressure vessel according to claim 1, wherein the pressure vessel is arranged in a filling device, wherein the outflow openings are closed in a media-tight manner from the outside, wherein the valve is then moved into the filling position and the pressure vessel is filled via the opening.

12. A pressure vessel comprising at least:
a vessel body having an opening,
wherein an end region of the vessel body is integrally formed at an upper end of the vessel body having a body wall, and
a valve disposed in the end region,
characterized in that
at least two outflow openings are formed in the body wall surrounding the opening of the end region below the opening,
in an outflow position of the valve, the outflow openings are fluidically connected via the valve to a body interior of the vessel body and the opening of the end region is closed in a media-tight manner, and
in a filling position of the valve, the opening of the end region is fluidically connected via the valve to the body interior of the vessel body,
characterized in that the valve has a valve body with a passage opening in which a valve plunger is arranged, which in a closed valve position of the valve closes the passage opening in a media-tight manner and in the outflow position and in the filling position of the valve opens the passage opening.

13. The pressure vessel according to claim 12, characterized in that the valve has a support element connected to or formed on the valve body and a spring element arranged inside the valve body and supported with a first end on the support element and with an opposite second end indirectly or directly on the valve plunger.

14. The pressure vessel according to claim 13, wherein the spring element is tensioned during a movement of the valve plunger from the closed valve position into the outflow position and is further tensioned during a movement of the valve plunger from the outflow position into the filling position.

15. The pressure vessel according to claim 13, characterized in that a lid is provided, which is arranged above the valve body and above the outflow openings in the end region, the lid having a filling opening in which an actuating plunger is arranged.

16. The pressure vessel according to claim 15, characterized in that an underside of the actuating plunger bears against an upper side of the valve plunger and/or is connected thereto, and wherein the actuating plunger closes the filling opening in a media-tight manner in the outflow position of the valve and opens the filling opening in the filling position of the valve.

17. The pressure vessel according to claim 13, characterized in that at least one of the support element and the valve body has an inflow opening.

18. The pressure vessel according to claim 12, characterized in that the two outflow openings are arranged opposite one another.

19. A pressure vessel, comprising at least:
a vessel body having an opening,
wherein an end region of the vessel body is integrally formed at an upper end of the vessel body having a body wall, and
a valve disposed in the end region,
characterized in that
at least two outflow openings are formed in the body wall surrounding the opening of the end region below the opening,
in an outflow position of the valve, the outflow openings are fluidically connected via the valve to a body interior of the vessel body and the opening of the end region is closed in a media-tight manner, and
in a filling position of the valve, the opening of the end region is fluidically connected via the valve to the body interior of the vessel body,
characterized by an overpressure protection and the overpressure protection has a bursting disc, and
characterized in that an overpressure channel is formed which extends through a valve plunger and the plunger and is closed in a media-tight manner by the bursting disc.

* * * * *